(12) United States Patent
Mikame

(10) Patent No.: US 6,597,986 B2
(45) Date of Patent: Jul. 22, 2003

(54) JUNCTION GUIDE DEVICE FOR PROVIDING GUIDANCE CONCERNING LOOPED BRANCH ROAD

(75) Inventor: Masami Mikame, Anjo (JP)

(73) Assignee: Denso Corporation, Kariya (JP)

( * ) Notice: Subject to any disclaimer, the term of this patent is extended or adjusted under 35 U.S.C. 154(b) by 69 days.

(21) Appl. No.: 09/841,003

(22) Filed: Apr. 25, 2001

(65) Prior Publication Data

US 2001/0037176 A1 Nov. 1, 2001

(30) Foreign Application Priority Data

Apr. 27, 2000 (JP) ........................................ 2000-127556

(51) Int. Cl.$^7$ .............................................. G01C 21/34
(52) U.S. Cl. ........................ 701/211; 701/208; 340/990; 340/995
(58) Field of Search ................................ 701/207, 208, 701/209, 211; 340/988, 990, 995

(56) References Cited

U.S. PATENT DOCUMENTS

| | | | |
|---|---|---|---|
| 5,638,280 A | * 6/1997 | Nishimura et al. ......... | 340/990 |
| 5,928,308 A | * 7/1999 | Nanba et al. ............... | 701/211 |
| 6,064,941 A | * 5/2000 | Nimura et al. .............. | 701/208 |
| 6,151,552 A | 11/2000 | Koizumi et al. ............ | 701/211 |
| 6,182,010 B1 | * 1/2001 | Berstis ........................ | 701/211 |
| 6,324,472 B1 | * 11/2001 | O'Shea ....................... | 701/211 |

FOREIGN PATENT DOCUMENTS

| | | |
|---|---|---|
| JP | A61213720 | 9/1986 |
| JP | A510775 | 1/1993 |
| JP | A9196694 | 7/1997 |
| JP | 1183518 | 3/1999 |

OTHER PUBLICATIONS

U.S. patent application Ser. No. 09/145,217, Koizumi, filed Sep. 1, 1998.

* cited by examiner

Primary Examiner—Gary Chin
(74) Attorney, Agent, or Firm—Posz & Bethards, PLC

(57) ABSTRACT

A vehicle navigation system stores road data and a plurality of schematic diagrams of junctions. Each schematic diagram represents a common pattern of a road forking to a loop road at a junction and includes a representation of the loop road and the forking pattern at the junction. When a motor vehicle approaches a junction, the system automatically determines by using road data whether a guide route forks to a loop road at the junction, and displays an appropriate schematic diagram selected from the stored schematic diagrams. The displayed diagram enables the driver to know the forking direction of the guide route at the next junction and whether the guide route forks to a loop road at the junction.

18 Claims, 15 Drawing Sheets

[JUNC_L]

[JUNC_R]

[EXIT_L]

[EXIT_R]

[PASS_L]

[PASS_R]

[ST]

JLQL

JLQR

JRQL

JRQR

XLQL

XLQR

XRQL

XRQR

XLCQL

XLCQR

XRCQL

XRCQR

JLQL_JL

JLQL_JR

JLQR_JL

JLQR_JR

JRQL_JL

JRQL_JR

JRQR_JL

JRQR_JR

XLQL_JL

XLQL_JR

XLQR_JL

XLQR_JR

XLCQL_JL

XLCQL_JR

XLCQR_JL

XLCQR_JR

XRQL_JL

XRQL_JR

XRQR_JL

XRQR_JR

XRCQL_JL

XRCQR_JR

XRCQR_JL

XRCQR_JR

JUNCTION GUIDE DEVICE FOR PROVIDING GUIDANCE CONCERNING LOOPED BRANCH ROAD

CROSS REFERENCE TO RELATED APPLICATION

This application is based on and incorporates herein by reference Japanese Patent Application No. 2000-127556 filed on Apr. 27, 2000.

BACKGROUND OF THE INVENTION

1. Field of the Invention

The present invention relates to a guide representation of branch roads, and particularly to a technique for providing an appropriate guide representation concerning a junction having a loop exit road.

2. Related Art

A navigation system is known as equipment for enabling a driver to arrive at the destination smoothly. It detects the present position of a motor vehicle by GPS (Global Positioning System) or the like as the motor vehicle travels, so that it represents the present position with a road map on a display. Moreover, some navigation systems calculate an appropriate travel route from the present position to the destination and provide the calculated result as a guide route to help a driver to travel more smoothly. In this case, a conventional map display device usually provides guidance by adding the guide route from the present position to the destination on a map showing the surrounding areas of the present position of the motor vehicle. This method displays the guide route in a color different from that of other roads so that the driver may readily recognize it. Furthermore, enlarged views of junctions on the guide route where the driver should turn are displayed so that the driver can accurately recognize the junction where he/she should turn next.

However, in case of providing guidance concerning junctions on roads which have the attributes of an expressway or a freeway, it may be difficult for a driver to decide about the turn direction, because it appears as if roads overlap each other on an enlarged view by reason of very small forking angle of the roads. Furthermore, in case of providing guidance concerning a loop connection road (ramp) which connects an underpass (ground road) to an overpass (elevated road) at a solid crossing, the following problem arises.

A technique for enabling a driver to easily know the direction in which his/her motor vehicle should be driven is proposed. It represents not only the turn direction at the next junction but also the turn direction at the junction beyond next. Actually, when the motor vehicle is directed to travel along the arrow on a cloverleaf-type ramp way as shown in FIG. 15A, that is, turn to the right at a first guide point G1 and thereafter go straight on without turning to the right at a second guide point G2, it displays a schematic diagram that represents two successive simple junctions as shown in FIG. 15B. However, since the junction actually has a loop exit road, it is not consistent with the displayed diagram. Thus it does not necessarily provide intelligible guidance.

Therefore, in the case of providing guidance concerning such a junction, other techniques should be employed. For example, JP-A-5-10775 proposes to display the turn direction and the name of the place to which the exit road from the junction ultimately leads at the first turning point where a motor vehicle should turn at the junction by using junction information (the shape of the junction, the number of lanes, a solid crossing or a grade crossing, etc.) received from a beacon when the next junction is a solid crossing. However, this technique cannot be applied to a junction on which a beacon is not installed since it uses the junction information from the beacon. Moreover, since this technique displays only the turn direction and the name of the place to which the exit road from the junction ultimately leads and does not display the shape of the junction, a driver cannot know that the exit road from the junction is a loop when the guide route runs along a cloverleaf-type ramp way as shown in FIG. 15A as described above.

In contrast to this, JP-A-61-213720 proposes to store information representing that a junction has a complex shape as flag data beforehand by incorporating the data into map data. When this provides guidance concerning an interchange of an expressway or a road having a complex shape, it retrieves the detailed shape data or the schematic diagram of a complex junction from image memory based on the flag data and displays that when it provides guidance immediately before the junction. In this case, it is not required to receive the information from the beacon. Furthermore it can represent that the exit road from the junction is a loop.

However, in the case of employing this technique, it is required to determine whether the actual shape of each junction fulfills the condition for a complex shape by field surveys beforehand, and to generate data of or assign a schematic diagram to the detailed shape of each junction that fulfills the condition for a complex shape and store them in the image memory. That is, it is required to investigate a large number of junctions (branch roads) in the area to which the technique is applied (for example, all parts of a country) one by one, and to collect data of the junctions that fulfill the condition for a complex shape. Thus, it actually requires a great deal of time and cost for data preparation.

SUMMARY OF THE INVENTION

The present invention has therefore an object to provide an appropriate guide representation concerning a looped branch road without consuming much time and costs.

The junction guide device according to the present invention stores a guide route from a point of departure to a destination and provides guidance for a driver while a motor vehicle travels along the guide route. When the motor vehicle approaches a junction concerning which the guidance should be provided, the device automatically determines by using stored road data whether the guide route forks to a loop road at the junction, and displays an appropriate schematic diagram of the junction. Therefore it is not necessary to make field surveys for determining whether each of actual junctions forks to a loop road one by one. The displayed schematic diagram represents the forking direction of the guide route at the junction. If it is determined that the guide route forks to a loop road, the displayed schematic diagram also includes a representation of the loop road. Thereby the driver can know the forking direction of the guide route at the next junction and whether the guide route forks to a loop road at the junction.

The displayed schematic diagram is one of the stored schematic diagrams each of which represents a common pattern found in the actual junctions. Since these common patterns can be easily obtained from administrative offices that have jurisdiction over road construction or literature, it is not necessary to make field surveys for obtaining the pattern of each of the actual junctions one by one. Further it is not necessary to install an information source such as a beacon along roads. Therefore the device can provide an appropriate guide representation concerning a looped branch road without consuming much time and costs, though the provided representation slightly differs from the actual shape of the loop road.

BRIEF DESCRIPTION OF THE DRAWINGS

The above and other objects, features and advantages of the present invention will become more apparent from the following detailed description made with reference to the accompanying drawings.

DETAILED DESCRIPTION OF THE PREFERRED EMBODIMENT

Figure 1:
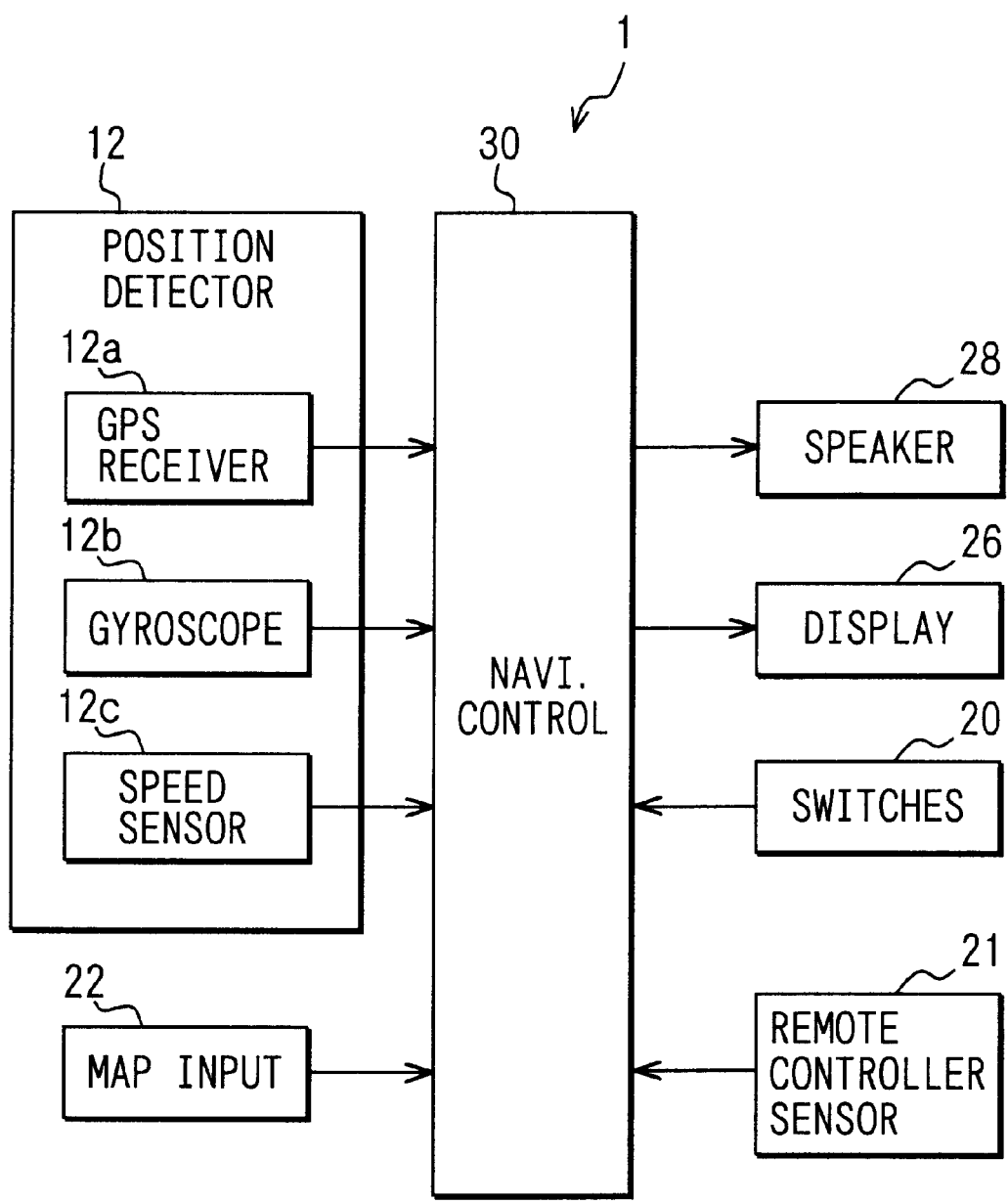
FIG. 1 is a block diagram showing an entire construction of a navigation system installed on a motor vehicle, the navigation system having a junction guide function according to an embodiment of the present invention.

Referring to FIG. 1, a navigation system 1 according to the present invention includes a position detector 12, a group of operation switches 20, a remote-control sensor 21, a map data input unit 22, a display unit 26, a loudspeaker 28, and a navigation control circuit 30. The position detector 12 detects the present position of a motor vehicle. The group of operation switches 20 is used for inputting various instructions to the system. The remote-control sensor 21 receives signals from a remote-control terminal (not shown) by which the same instructions as those by the group of operation switches 20 may be inputted. The display unit 26 provides various displayers such as a map or a TV program. The navigation control circuit 30 performs various processes according to the inputs from the position detector 12, the group of operation switches 20, the map data input unit 22 and the remote-control terminal and controls the display unit 26 and the loudspeaker 28.

The position detector 12 includes a GPS receiver 12a, a gyroscope 12b, and a speed sensor unit 12c. The GPS receiver 12a receives radio waves transmitted from a satellite for GPS via a GPS antenna. The gyroscope 12b detects a magnitude of rotary motion applied to the motor vehicle. The speed sensor unit 12c comprises a speed sensor, wheel sensors and the like and detects a mileage of the motor vehicle. Since these sensors 12a–12c involve their own errors, they are configured to be used for complementing each other. The position detector 12 may comprise only a part of the above sensors 12a–12c depending on the required precision. Furthermore, a geomagnetic sensor which detects the absolute direction based on the geomagnetism or other sensors that determine the direction by accumulating the steering angle of the motor vehicle which is obtained from the difference of rotary angles of right and left front wheels may be employed.

As the group of operation switches 20, touch-switches integrated with and provided on the display unit 26 or mechanical key-switches provided on the periphery of the display unit 26 may be employed. The touch-switches are formed of infrared sensors arranged lengthwise and crosswise on the screen of the display unit 26. When a driver blocks off the infrared light by his/her finger or a touch-pen, the position where the infrared light is blocked off is detected as values of two-dimensional coordinates (X, Y). Thus, the driver can input a specific instruction by directly touching the screen.

This group of operation switches 20 are various switches for operating the navigation system 1, and specifically a switch for switching the content displayed on the display unit 26 and a switch for the driver's setting a route to the destination are included.

The map data input unit 22 is used for inputting various data including data for map matching for improving the precision of detection of the present position and road data which represents connections of roads from a storage memory. A CD-ROM or a DVD is usually employed as the storage memory in view of the amount of data. However, other media such as a memory card may be employed.

The format of the map data includes link information, node information and information of the connections between links. The link information includes information regarding a link itself, such as 'link ID' that is a unique number for identifying each link, 'link class' for identifying it as a expressway, a toll road, an ordinary road or an access road, 'coordinates of the starting point' and 'coordinates of the end point' of the link, and 'link length' that represents the length of the link. The node information includes 'node ID' that is a unique number for identifying each node to which a link is connected, data which represents No right/left turn or the presence of a signal at the crossing corresponding to the node and the like. The information of the connections between links includes, for example, data which represents that it is not passable from one link to another because the link is a one-way road. When the link is a one-way road, although it is passable from a link to the link, it is not passable from another link to the same link sometimes. Therefore whether it is passable or not is determined depending on the form of the connection between links.

In the road map data of the present embodiment, a plurality of maps of a specific area are stored, for example, on eight different scales so that maps on various scales may be displayed.

Furthermore schematic diagrams of forking or branching patterns of junctions are stored so that they may be displayed when guidance is provided concerning a junction in expressways including freeways.

The display unit 26 is a color display unit. On the screen of the display unit 26, the map data inputted from the map data input unit 22 is displayed, and mark indicating the present position of the motor vehicle which is detected by the position detector 12, a guide route provided on the map, and additional data such as names or marks are also displayed and superimposed on the map data. Moreover notice of an enlarged view of a crossing or a schematic diagram of a junction or information for calling the driver's attention is also displayed.

The loudspeaker 28 gives a user speech information which is provided as a result of processing in the navigation control circuit 30 for various guidance.

The navigation control circuit 30 is mainly formed of a microcomputer which comprises a CPU, ROM, and RAM, and controls the entire system.

This navigation system 1 has a route guidance function which receives the position of the destination and, if necessary, designation of a specific route (or a transit point) such as an expressway as inputs via the remote-control sensor 21 or the group of operation switches 20, and automatically selects and displays the optimal route from the present position to the destination as a guide route. For example, Dijkstra's algorithm may be used for automatically establishing the optimal route in the known manner. While the motor vehicle travels along the guide route, the navigation system 1 displays an enlarged view of a crossing when the motor vehicle approaches the crossing concerning which guidance should be provided on ordinary roads and displays a schematic diagram of a junction when the motor vehicle approaches the junction on expressways.

Figure 2:
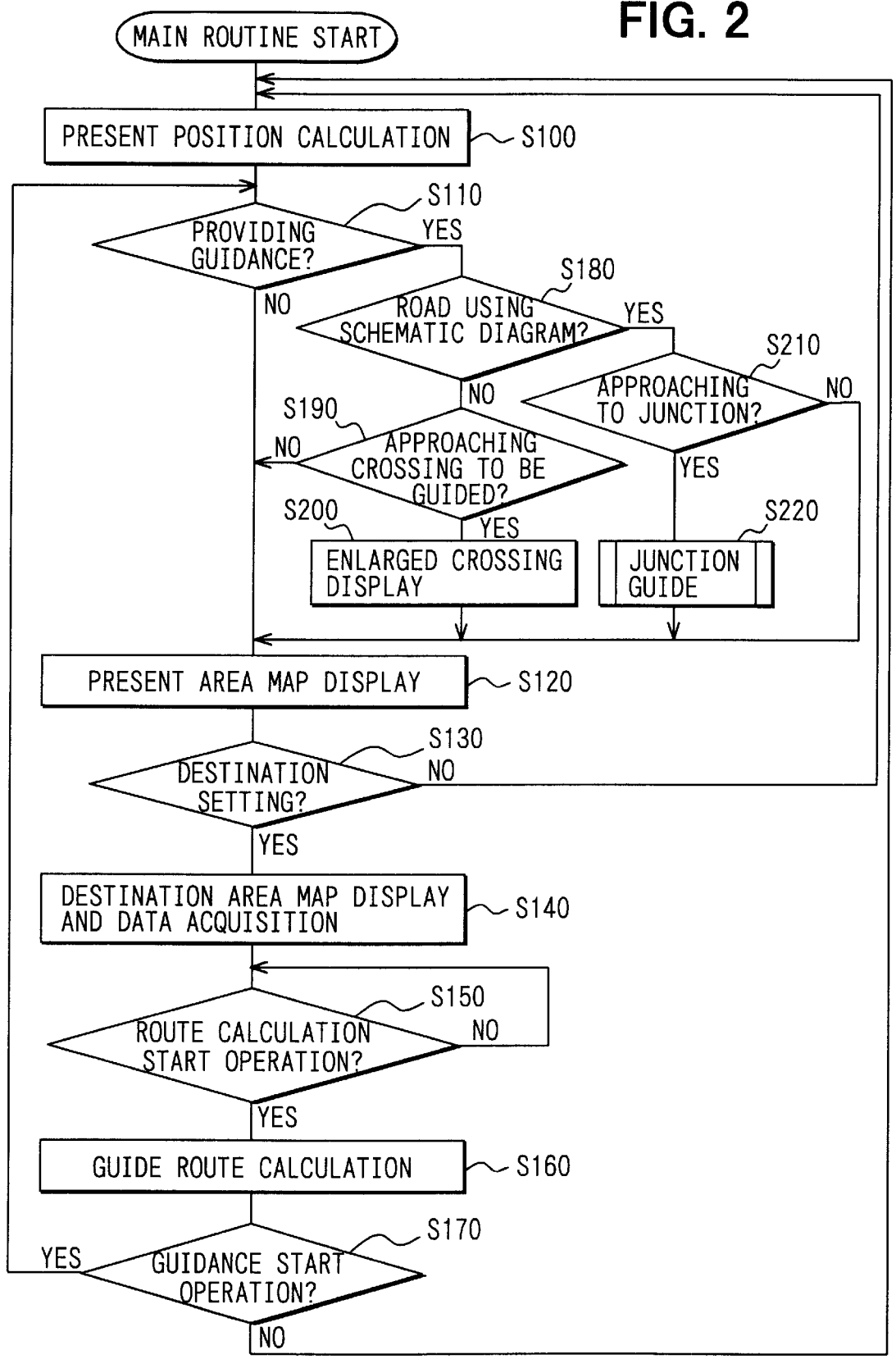
FIG. 2 is a flowchart of a process performed by a control section of the embodiment.

Referring to FIG. 2, the process performed by the control circuit 30 will be explained in detail. This process is programmed in the microcomputer of the control circuit 30.

If the power supply of the navigation system 1 is turned on, the process shown in FIG. 2 starts after the predetermined initialization.

First, process for the present position calculation is performed at step S100. The present position of the motor vehicle is calculated based on the signal from the position detector 12. Next, at step S110, it is determined whether the system is providing guidance, that is, whether it is in a mode (guidance mode) where guidance for leading the driver to the destination (in this case, guidance concerning crossings) is provided as a result of operation by the driver. If the system is not in the guidance mode(S110:NO), at step S120, the process for displaying a map of the surrounding areas of the present position is performed by reading the map data of the corresponding area from a CD-ROM or a DVD inserted into the map data input unit 22.

Next, at step S130, it is determined whether operation for setting the destination is performed by the driver. If it is not performed (S130:NO), the routine returns to the process of step S100 for calculating the present position. Therefore, the map of the surrounding areas of the present position is updated and displayed repeatedly as the motor vehicle travels, while the system is not in the guidance mode (S110:NO) and operation for setting the destination is not performed (S130:NO).

If the driver perform operation for setting the destination (S130:YES), the system displays a map of the surrounding areas of the destination inputted by the driver. Then acquisition of the accurate position data of the destination and, if necessary, designation of a specific road is performed based on the driver's input at step S140. Next, at step S150, the system waits for the driver's operation for starting calculation of the guide route. If the operation is performed by the driver (S150:YES), at step S160, the calculation of the route from the present position to the specified destination is performed based on the link information in the map data by, for example, Dijkstra's algorithm. The route is calculated to minimize the cost of the route which starts from the present position and reaches the destination via the transit point. The node IDs corresponding to the crossings on the calculated route and the link IDs corresponding to the roads that connect the crossings on the calculated guide route are extracted from the map data in a CD-ROM inserted in the map data input unit 22 and stored in the working memory in the control circuit.

Next, at step S170, it is determined whether operation for starting guidance is performed by the driver. If the operation is not performed within a predetermined time (S170:NO), the routine directly returns to step S100 of the present position calculation and the above steps S100, S110, S120, S130 are repeatedly performed.

If operation for starting the guidance is performed within the predetermined time (S170:YES), the routine returns to step S110 so that it is determined whether the system is in the guidance mode. In this case, the conclusion at step S110 is YES because the operation for starting the guidance has been performed and accordingly the routine moves to step S180. At step S180, it is determined whether the motor vehicle is on the road to which guidance using a schematic diagram of a junctions is applied. This is determined depending on whether the approach road to the next junction and the exit road from the junction on the guide route are all expressways or access roads (expressway etc.). That is, the guidance using a schematic diagram of a junction is provided when the road on which the motor vehicle is present and which approaches the next junction is expressway etc. and the road which leaves the junction along the guide route is also expressway etc.

If the motor vehicle is not on the road to which the guidance using a schematic diagram of a junction is applied (S180:NO), the routine moves to step S190 so that it is determined whether the motor vehicle is approaching a crossing concerning which the guidance should be provided and within a predetermined distance from the crossing. In this case, the crossing concerning which the guidance should be provided means a crossing that is other than the above crossing to which the guidance using a schematic diagram of a junction is applied. It is a crossing which corresponds to one of the node IDs extracted at step S160 (that is, a crossing on the guide route), and at which the guide route turns. The predetermined distance is, for example, 200 m or 400 m. If the crossing concerning which the guidance should be provided is not within the predetermined distance (S190:NO), the routine moves to step S120 so that the usual process for displaying a map of the surrounding areas of the present position is continued.

When the motor vehicle is within the predetermined distance from the crossing concerning which the guidance should be provided, the process for displaying an enlarged view of the crossing is performed at step S200. The largest-scale (for example, 1:4,000) one of the above-described maps on eight different scales is used for providing the enlarged view of the crossing. The map on the largest-scale of 1:4,000 is enlarged into a map on a scale of 1:500. Basically this enlarged map on the scale of 1:500 is directly displayed. However, it may be enlarged or reduced into a map on any scale before displaying. When the crossing has a complex shape, the enlarged map of the crossing is further enlarged two or five times so that the resultant enlarged map on a scale of 1:250 or 1:100 may be displayed. On the other hand, when it is desirable to display the entire shape of the crossing, the map on the scale of 1:500 is reduced to a half or a quarter so that the resultant reduced map on a scale of 1:1000 or 1:2000 may be displayed as a wide-area map.

If the motor vehicle is on the road to which the guidance using a schematic diagram of a junction is applied (S180:YES), the routine moves to step S210 so that it is determined whether the motor vehicle is within a predetermined distance from the next junction, that is, whether it is approaching the next junction. The predetermined distance may be equal to the predetermined distance used at step S190, or longer. If the next junction is not within the predetermined distance (S210:NO), the routine moves to step S120.

Figure 3:
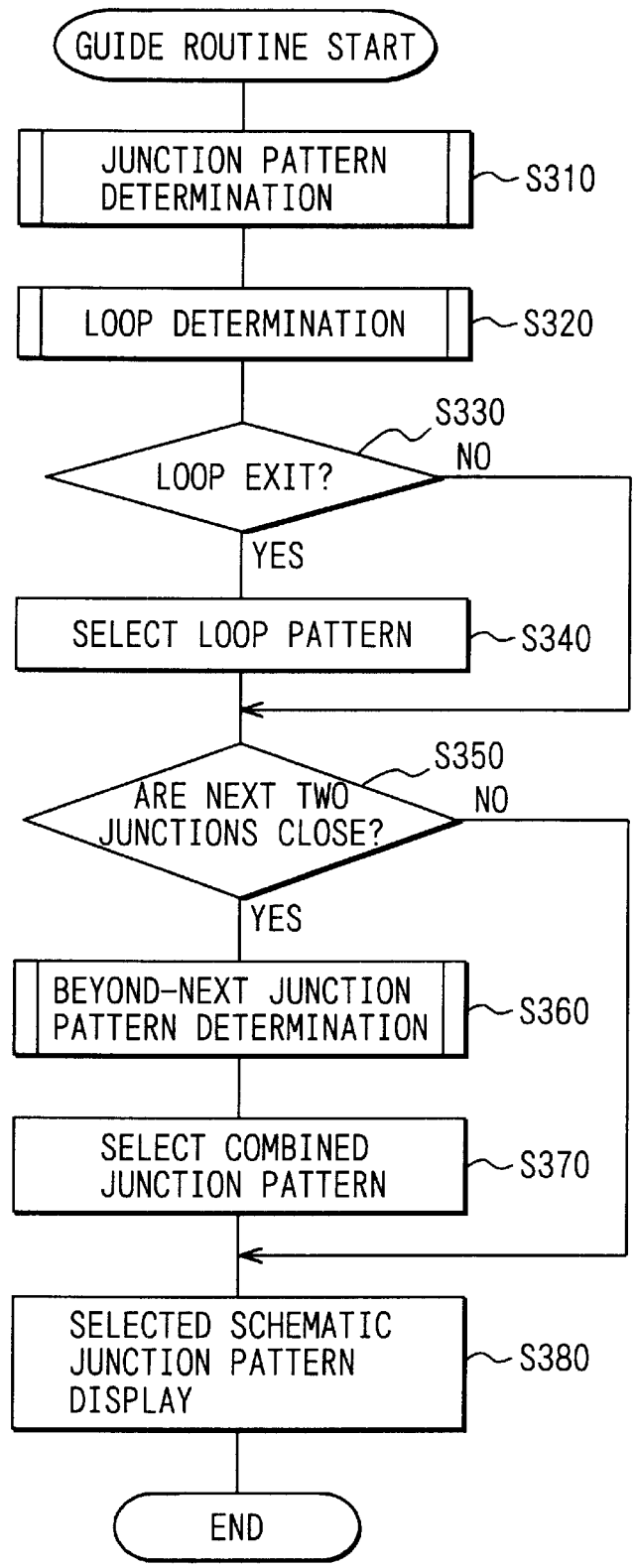
FIG. 3 is a flowchart of a process for providing guidance concerning a junction, the process being performed in the process shown in FIG. 2.

If the motor vehicle is within the predetermined distance from the next junction, the process for providing guidance concerning the next junction is performed at step S220 and thereafter the routine moves to step S120. Referring to FIG. 3, the process of step S220 for providing the guidance concerning the next junction will be explained here.

Figure 8A:
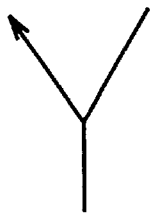
FIGS. 8A–8G are schematic diagrams of forking patterns at various junctions.
Figure 8B:
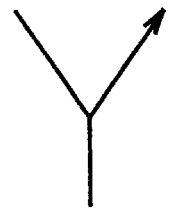
Figure 8C:
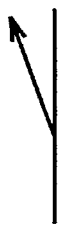
Figure 8D:
Figure 8E:
Figure 8F:
Figure 8G:

First the process for determining a schematic diagram corresponding to the next junction is performed at step S310. That is, it is determined to which of seven patterns in FIGS. 8A–8G the next junction corresponds. FIG. 8A is a schematic diagram showing a pattern that the guide route forks left at the junction. FIG. 8B is a schematic diagram showing a pattern that the guide route forks right at the junction. FIG. 8c is a schematic diagram showing a pattern that the guide route forks to a left exit ramp. FIG. 8D is a schematic diagram showing a pattern that the guide route forks to a right exit ramp. FIG. 8E is a schematic diagram showing a pattern that the guide route runs without forking to a left exit ramp. FIG. 8F is a schematic diagram showing a pattern that the guide route runs without forking to a right exit ramp. FIG. 8G is a schematic diagram showing a pattern that the guide route runs straight.

Figure 4:
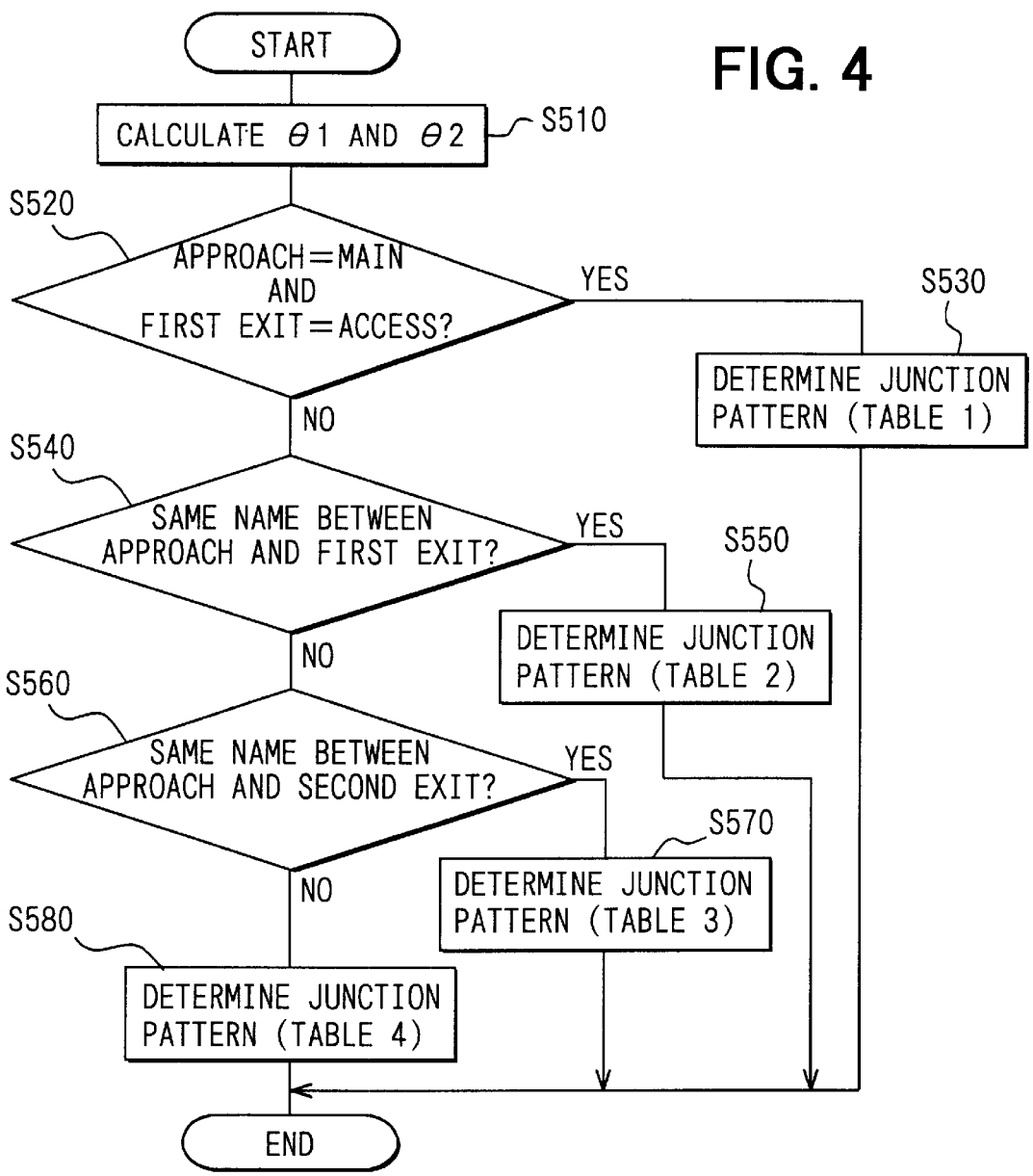
FIG. 4 is a flowchart of a process for determining a forking pattern at the junction, the process being performed in the process shown in FIG. 3.
Figure 5:
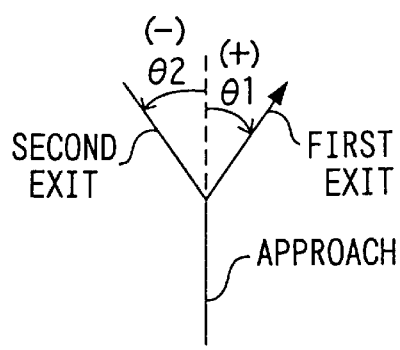
FIG. 5 is a diagram providing definitions of angles of two exit roads from a junction.

Referring to FIG. 4, the process for determining a forking pattern will be explained. First, the first angular difference $\theta 1$ ($-180° \leq \theta 1 \leq 180°$) between the approach road to the junction and a first exit road from the junction and the second angular difference $\theta 2$ ($-180° \leq \theta 2 \leq 180°$) between the approach road to the junction and a second exit road from the junction are calculated at step S510. The approach road means the road (or the lane) approaching the junction. The first exit roads means the road that is on the guide route and leaving the junction. The second exit road means the road that is not on the guide route and leaving the junction. As shown in FIG. 5, it is so defined that the same direction as that of the approach road is 0°, angles are positive in the clockwise direction and negative in the counterclockwise direction.

Figure 6A:
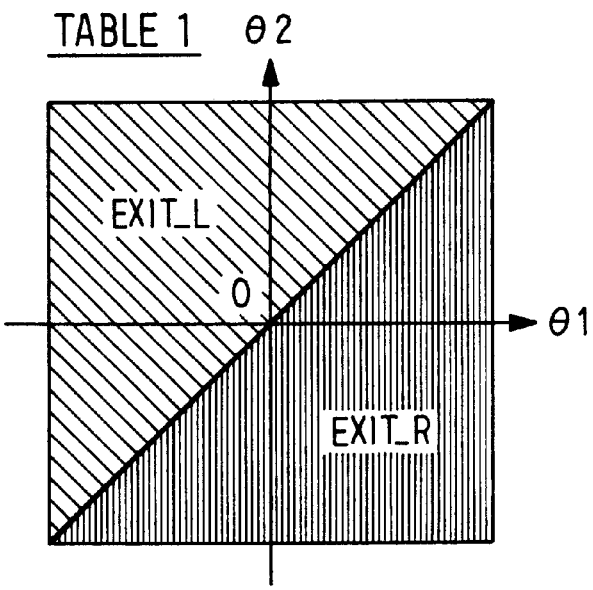
FIG. 6A is a table showing a relation between the angles of the exit roads from a junction and a forking pattern at the junction in case that the exit road from the junction is an exit road from an expressway.

When the two angles $\theta 1$, $\theta 2$ are calculated, it is determined whether the approach road is a main road and the first exit road is an access road connected to an ordinary road (or to a service area or a parking area) at step S520. When these conditions are fulfilled (S520:YES), the forking pattern of the junction is determined by using table 1 shown in FIG. 6A at step S530 as will be described later.

Figure 6B:
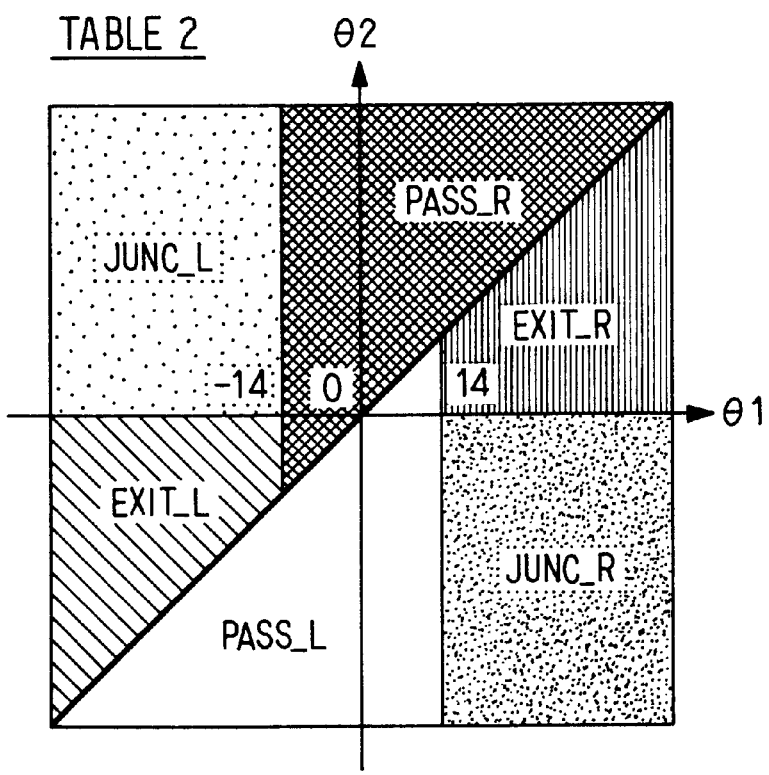
FIG. 6B is a table showing a relation between the angles of the exit roads from a junction and a forking pattern at the junction in case that the junction is a junction on an expressway and the approach road to the junction and the exit road from the junction have the same name.

If the conditions at step S520 are not fulfilled (S520:NO), at step S540, it is determined whether the approach road and the first exit road have the same name. If they have the same name (S540:YES), the forking pattern of the junction is determined by using table 2 shown in FIG. 6B at step S550 as will be described later.

Figure 6C:
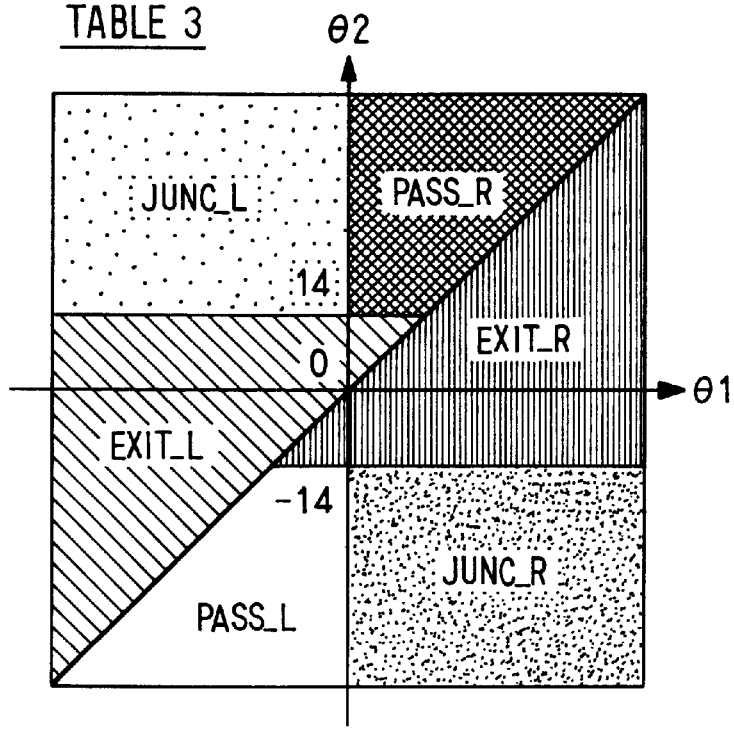
FIG. 6C is a table showing a relation between angles of the exit roads from a junction and a forking pattern at the junction in case that the junction is a junction on an expressway and the approach road to the junction and the other exit road from the junction have the same name.
Figure 6D:
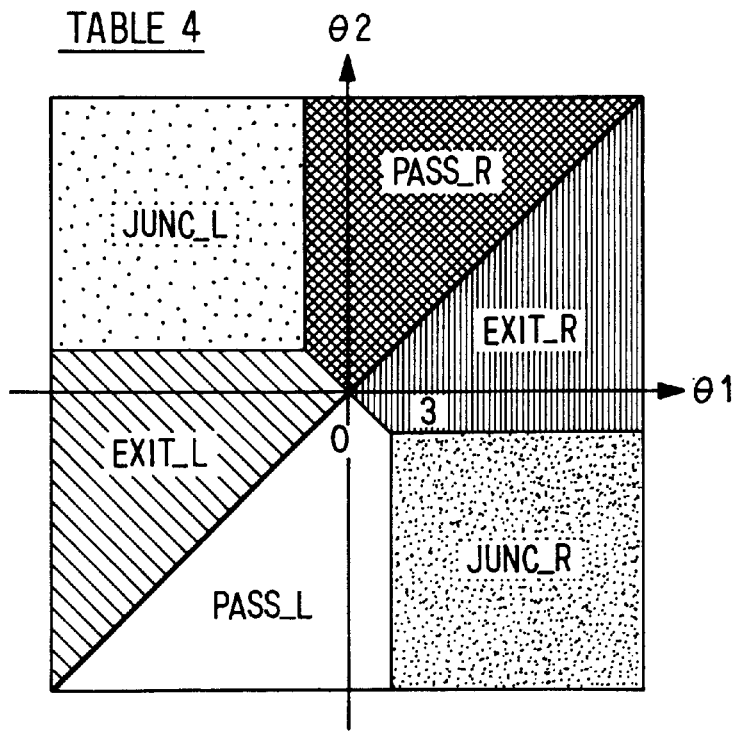
FIG. 6D is a table showing a relation between the angles of the exit road from a junction and a forking pattern at the junction in case that the junction is a junction on an expressway and the approach road to the junction and the two exit roads from the junction all have the same name or each of them have a distinct name.

If the approach road and the first exit road have different names (S540:NO), at step S560, it is determined whether the approach road and the second exit road have the same name. If they have the same name (S560:YES), the forking pattern of the junction is determined by using table 3 shown in FIG. 6C at step S570. If they have different names (S560:NO), the forking pattern of the junction is determined by using table 4 shown in FIG. 6D at step S580.

Process at Step S530

Table 1 shows the relation between the angles $\theta 1$, $\theta 2$ and the forking patterns at a junction having an exit road leading to an exit of an expressway. In this case, the forking pattern of the junction is determined based on the relation between the angles $\theta 1$, $\theta 2$ as follows.

① Pattern [ST] (FIG. 8G), if $\theta 1 = \theta 2$;
② Pattern [EXIT_R] (FIG. 8D), if $\theta 1 > \theta 2$;
③ Pattern [EXIT_L] (FIG. 8C), if $\theta 1 < \theta 2$.

Process at Step S550

Table 2 shows the relation between the angles $\theta 1$, $\theta 2$ and the forking patterns when the approach road and the first exit road have the same name at a junction on an expressway. In this case, the forking pattern of the junction is determined based on the relation between the angular differences $\theta 1$, $\theta 2$ and the value of $\theta 1$ as follows.

(1) Pattern [ST] (FIG. 8G), if $\theta 1 = \theta 2$;
(2) If $|\theta 1| \leq 14$ except the case of (1), ① Pattern [PASS_L] (FIG. 8E), if θ1>θ2;
② Pattern [PASS_R] (FIG. 8F), if θ1<θ2;
(3) If θ1≧0 and θ2≧0 except the case of (1) and (2),
① Pattern [EXIT_R] (FIG. 8D), if θ1>θ2;
② Pattern [PASS_R] (FIG. 8F), if θ1<θ2;
(4) If θ1<0 and θ2<0 except the case of (1)–(3),
② Pattern [PASS_L] (FIG. 8E), if θ1>θ2;
① Pattern [EXIT_L] (FIG. 8C), if θ1<θ2;
(5) Otherwise
① Pattern [JUNC_R] (FIG. 8B), if θ1>θ2;
② Pattern [JUNC_L] (FIG. 8A), if θ1<θ2.

Process at Step S570

Table 3 shows the relation between the angles θ1, θ2 and the forking patterns when the second exit road and the approach road have the same name at a junction on an expressway. In this case, the forking pattern of the junction is determined based on the relation between the angles θ1, θ2 and the value of θ2 as follows.

(1) Pattern [ST] (FIG. 8G), if θ1=θ2;
(2) If |θ1|≦14 except the case of (1),
  Pattern [EXIT_R] (FIG. 8D), if θ1>θ2;
  Pattern [EXIT_L] (FIG. 8C), if θ1<θ2;
(3) If θ1≧0 and θ2≧0 except the case of (1) and (2),
  Pattern [EXIT_R] (FIG. 8D), if θ1>θ2;
  Pattern [PASS_R] (FIG. 8F), if θ1<θ2;
(4) If θ1<0 and θ2<0 except the case of (1)–(3),
  Pattern [PASS_L] (FIG. 8E), if θ1>θ2;
  Pattern [EXIT_L] (FIG. 8C), if θ1<θ2;
(5) Otherwise
  Pattern [JUNC_R] (FIG. 8B), if θ1>θ2;
  Pattern [JUNC_L] (FIG. 8A), if θ1<θ2.

Process at Step S580

Table 4 shows the relation between the angles θ1, θ2 and the forking patterns when the first exit road, the second exit road, and the approach road have all the same name or distinct names each at a junction on an expressway. In this case, the forking pattern of the junction is determined based on the relation between θ1, θ2 and the value of each of θ1 and θ2.

(1) Pattern [ST] (FIG. 8G), if θ1=θ2;
(2) If |θ1|≦3 and |θ1|≦|θ2| except the case of (1),
  Pattern [PASS_L] (FIG. 8E), if θ1>θ2;
  Pattern [PASS_R] (FIG. 8F), if θ1<θ2;
(3) If |θ1|≦3 except the cases of (1) and (2),
  Pattern [EXIT_R] (FIG. 8D), if θ1>θ2;
  Pattern [EXIT_L] (FIG. 8C), if θ1<θ2;
(4) If |θ2|≧3, and θ1≧0 and θ2≧0 except the cases of (1)–(3),
  Pattern [EXIT_R] (FIG. 8D), if θ1>θ2;
  Pattern [PASS_R] (FIG. 8F), if θ1<θ2;
(5) If |θ2|≧3, and θ1<0 and θ2<0 except the cases of (1)–(4),
  Pattern [PASS_L] (FIG. 8E), if θ1>θ2;
  Pattern [EXIT_L] (FIG. 8C), if θ2<θ2;
(6) If |θ2|≦3 except the cases of (1)–(5),
  Pattern [JUNC_R] (FIG. 8B), if θ1>θ2;
  Pattern [JUNC_L] (FIG. 8A), if θ1<θ2;
(7) Otherwise
  Pattern [EXIT_R] (FIG. 8D), if θ1>θ2;
  Pattern [EXIT_L] (FIG. 8C), if θ1<θ2.

In this way, the forking pattern of the junction is determined at step S310 in FIG. 3. Thereafter the process for determining whether the first exit road along which the guide route runs is a loop is performed at step S320 as follows.

Figure 7:
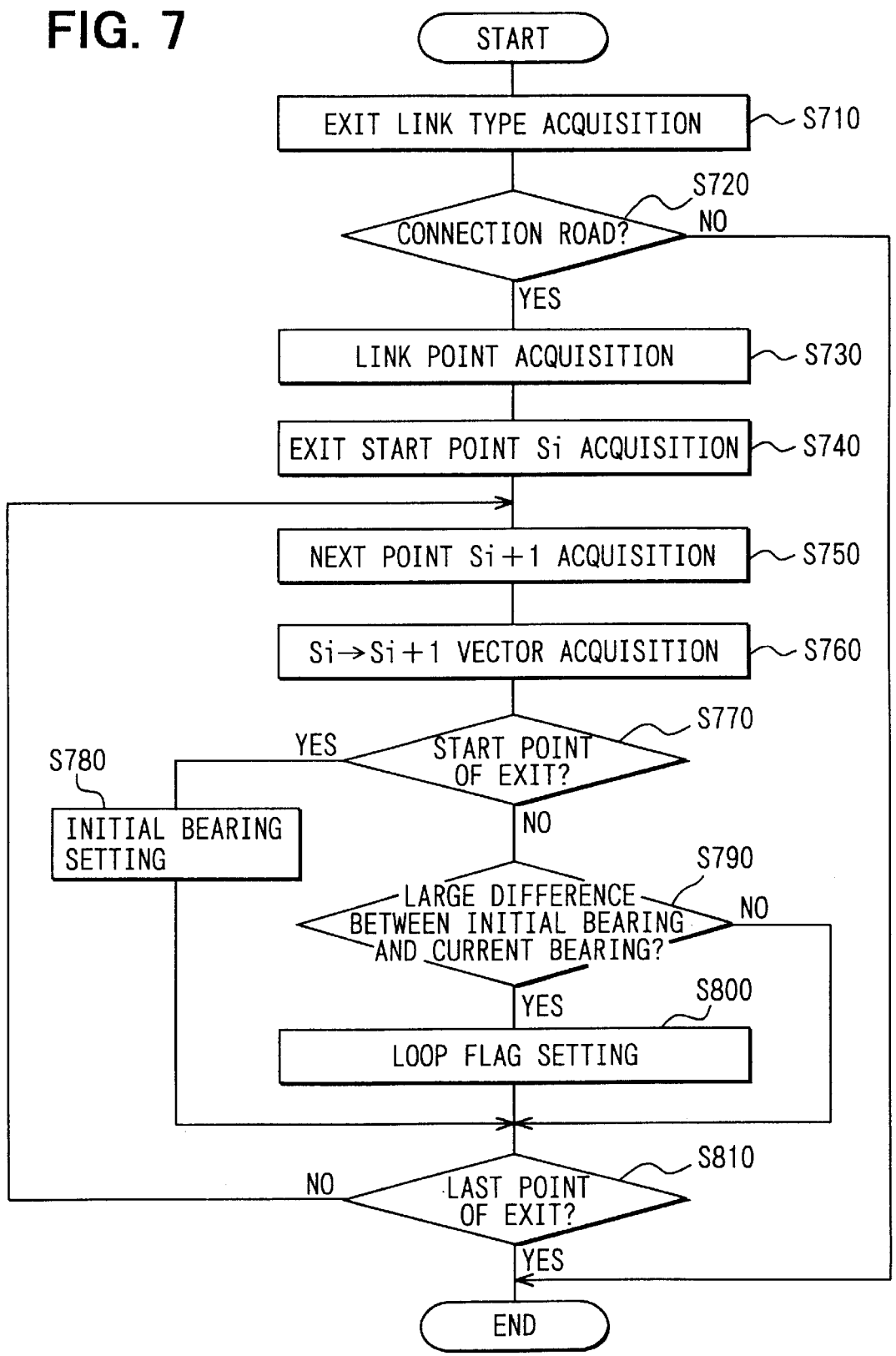
FIG. 7 is a flowchart of a process for determining whether an exit road from the junction is a loop, the process being performed in the process shown in FIG. 3.

Referring to FIG. 7, the type of the link corresponding to the exit road is acquired first at step S710. It is determined whether the type of the link is a connection road at step S720. The connection road is a road known as an access road or a ramp way. Here, no notice is taken of whether the connection road is a loop.

If the corresponding link is a connection road (S720:YES), all points S0–Sn on the links which constitute the connection road are acquired at step S730. Then variable i is set to zero at step 740, that is, the current point is set to the starting point of the exit links and the coordinates Si of the current point indicates the coordinates S0 of the starting point of the exit links. Coordinates Si+1 indicates the coordinates of the point next to the current point Si on the exit links at step S750. At step S760, the direction vector which connects the current point Si to the next point Si+1 is acquired.

If the current point Si is the starting point S0 of the exit links (S770:YES), the direction vector acquired at step S760 is set as the initial direction at step S780. At step S810, it is determined whether the point Si+1 is the last point Sn on the exit links. If the point Si+1 is not the last point Sn (S810:NO), variable i is set to i+1 (i is incremented) and the routine returns to step S750.

On the other hand, when the point Si is not the starting point S0 of the exit links (S770:NO), it is determined whether the angular difference between the initial direction, which is set at step S760, and the current direction, which is acquired at step S760, is equal to or greater than a predetermined angle at step S790. The predetermined angle may be set properly based on the measured angular differences between the directions at the points on an actual loop road. In this way, it is set to, for example, 180 degrees. If the angular difference between the initial direction and the current direction is equal to or greater than the predetermined angle (S790:YES), it is concluded that the exit road is a loop. In this case, a loop flag is set and information which represents that the loop is a clockwise loop or a counterclockwise loop is stored at step S800. If the angular difference between the directions is less than the predetermined angle (S790:NO), the routine moves directly to step S810. It may be determined whether the exit road is a loop depending on whether the angular difference between the directions is within the range of the angular differences measured on the actual loop roads instead of using the predetermined angle at step S790.

In this way, steps S750–S810 are repeatedly performed. If the processing is finished on all the points S0–Sn which were acquired at step S730 (S810:YES), this routine terminates. Further, if the type of the link corresponding to the exit road is not a connection road (S720:NO), this routine immediately terminates.

Turning to FIG. 3 again, if the processing of step S320 for determining whether the exit road is a loop is finished, it is finally determined whether the exit road is a loop at step S330 based on the loop flag that was set at step S320. If the exit road is not a loop (S330:NO), the routine skips step S340 and directly moves to step S350. If the exit road is a loop (S330:YES), the routine moves to step S340. At step S340, a pattern corresponding to the junction is selected from the twelve patterns shown in FIGS. 9A–9L. Each of these patterns is formed by adding a loop to one of the patterns shown in FIGS. 8A–8G. Specifically the 12 patterns in FIGS. 9A–9L are formed by adding a clockwise loop and a counterclockwise loop to the 6 patterns shown in FIGS. 8A–8F. Loops are not added to the straight pattern shown in FIG. 8G since this pattern does not include a junction.

Figure 9A:
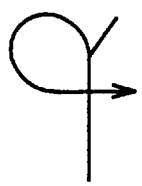
FIGS. 9A–9L are schematic diagrams of patterns of various junctions having a loop exit road.
Figure 9B:
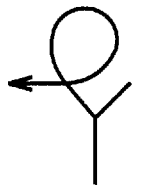
Figure 9C:
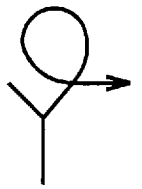

In the case that the pattern [JUNC_L] in FIG. 8A is selected at step S310, the pattern [JLQL] shown in FIG. 9A is selected if the exit road is a counterclockwise loop and the pattern [JLQR] shown in FIG. 9B is selected if the exit road is a clockwise loop at step S340. The other patterns are selected in the similar way.

Figure 12A:
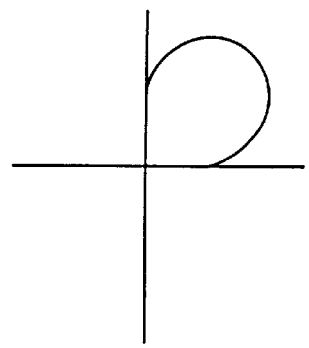
FIGS. 12A, 12B are schematic diagrams showing two types of cloverleaf-type ramps that have a clockwise loop.
Figure 12B:
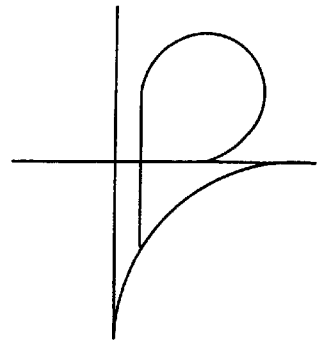

When the loop exit road is a part of a cloverleaf-type ramp, clockwise loops are of two types as shown in FIGS. 12A, 12B. That is, the route may fork right at the junction and thereafter run along a clockwise loop road as shown in FIG. 12A. Alternatively, the route may fork left at the junction and thereafter run along a clockwise loop as shown in FIG. 12B. Similarly counterclockwise loops are of two types.

At step 350, it is determined whether the distance between the next junction and the junction beyond next is within a predetermined distance. The predetermined distance is determined based on the average distance required for the driver to change traffic lanes.

If the distance between the next two successive junctions (next junction and junction beyond next) is within the predetermined distance (S350:YES), the process for determining the pattern, which is one of the patterns in FIGS. 8A–8G, corresponding to the junction beyond next is performed at step S360 in the similar way to step S310. When the pattern corresponding to the junction beyond next is determined, a pattern of combined junction is selected from 24 patterns shown in FIGS. 10A–10L and FIGS. 11A–11L based on the combination of the next junction and the junction beyond next at step S370. If the junction beyond next corresponds to the straight pattern in FIG. 8G, the pattern selected from the patterns in FIGS. 9A–9L at step S340 is ultimately employed without selecting a pattern from the patterns in FIGS. 10A–10L and FIGS. 11A–11L.

If the junction beyond next corresponds to one of the patterns in FIGS. 8A–8F, it is combined with the pattern selected at step S340 so that a pattern corresponding to the resultant combination is selected from 24 patterns shown in FIGS. 10A–10L and FIGS. 11A–11L. When the 12 patterns in FIGS. 9A–9L are combined with the 6 patterns in FIGS. 8A–8F, no distinction is made between the patterns in FIGS. 8A, 8C, 8F. That is, in the case that the pattern in FIG. 9A is selected at step S340, the pattern in FIG. 10A is selected at step S370 if the junction beyond next corresponds to the pattern in FIG. 8A, but equally the pattern in FIG. 10A is selected if the junction beyond next corresponds to the pattern in FIGS. 8C or 8F. No distinction is made between the patterns in FIGS. 8B, 8D, 8E similarly.

The reason for making no distinction between these patterns is as follows. The junction beyond next is displayed in addition to the next junction for enabling the driver to anticipate the condition on the road further ahead. Therefore the driver need not know the type of the junction beyond next. When the motor vehicle advances beyond the next junction, the junction that was formerly the junction beyond next becomes the next junction. Then the junction is displayed by using one of the patterns in FIGS. 8A–8G so that the driver know the type of the junction, that is, the case that the guide route forks at the junction, the case that the guide route forks to the exit ramp at the junction, or the case that the guide route runs without forking to the exit ramp at the junction.

When the pattern of combined junction is selected at step S370, it is displayed on the display unit 26 at step S380. If the distance between the next junction and the junction beyond next is not within the predetermined distance (S350:No), steps S360, S370 are skipped and the pattern selected at step S340 is displayed on the display unit 26 at step S380.

Next several examples of representation of a schematic diagram of a junction will be explained.

EXAMPLE 1

Figure 9D:
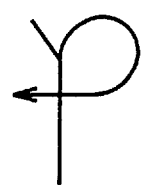
Figure 9E:
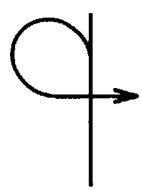
Figure 9F:
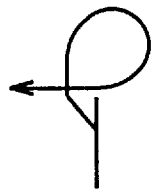
Figure 9G:
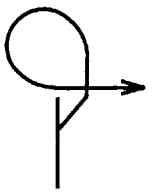
Figure 9H:
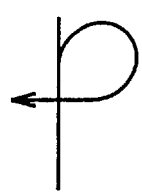
Figure 9I:
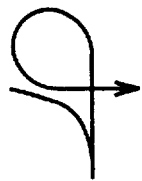
Figure 9J:
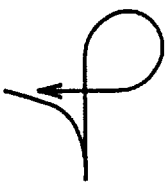
Figure 9K:
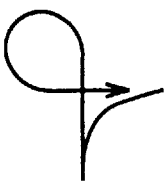
Figure 9L:
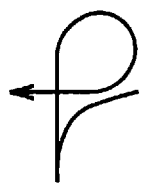
Figure 10A:
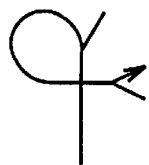
FIGS. 10A–10L are schematic diagrams of patterns, each of which includes a pattern of a junction having a loop exit road and a forking pattern at the junction beyond the loop exit road.
Figure 10B:
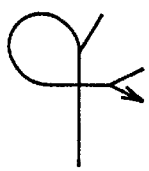
Figure 12C:
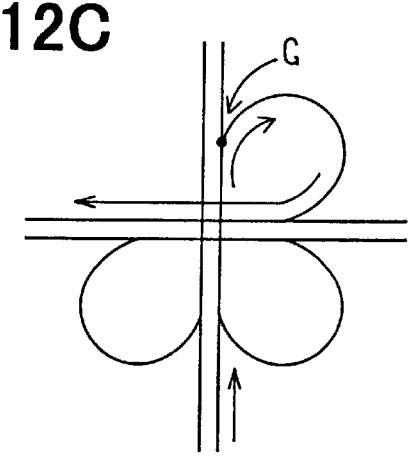
FIGS. 12C–12F are schematic diagrams used for explanations of some examples of representations according to the embodiment of the present invention.
Figure 12D:
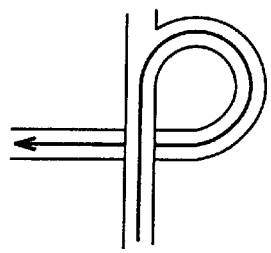

In the case that a motor vehicle travels along an arrow on a cloverleaf-type ramp as shown in FIG. 12C, a schematic diagram of a junction shown in FIG. 12D is displayed by using the pattern [JRQR] in FIG. 9D while the motor vehicle is within the predetermined distance from the next junction corresponding to a guide point G.

EXAMPLE 2

Figure 12E:
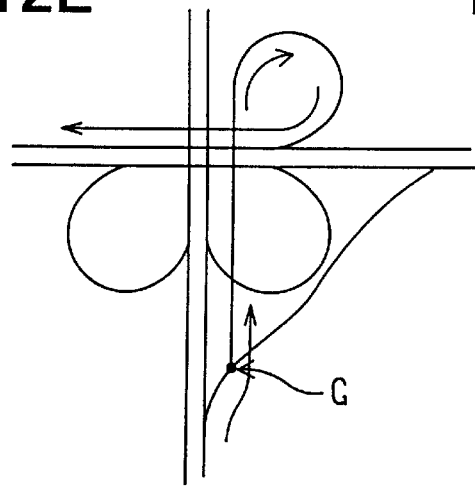
Figure 12F:
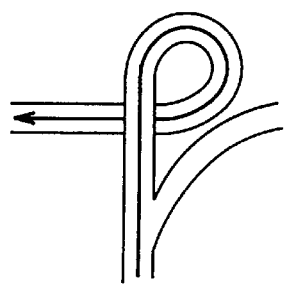

In the case that a motor vehicle travels along an arrow on a cloverleaf-type ramp as shown in FIG. 12E, a schematic diagram of a junction shown in FIG. 12F is displayed by using the pattern [JLQR] in FIG. 9B while the motor vehicle is within the predetermined distance from the next junction corresponding to a guide point G.

EXAMPLE 3

Figure 10C:
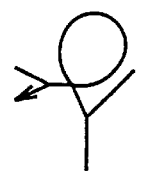
Figure 10D:
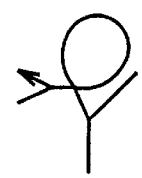
Figure 10E:
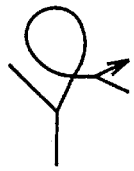
Figure 10F:
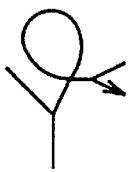
Figure 10G:
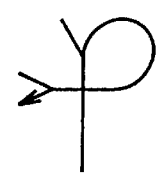
Figure 13A:
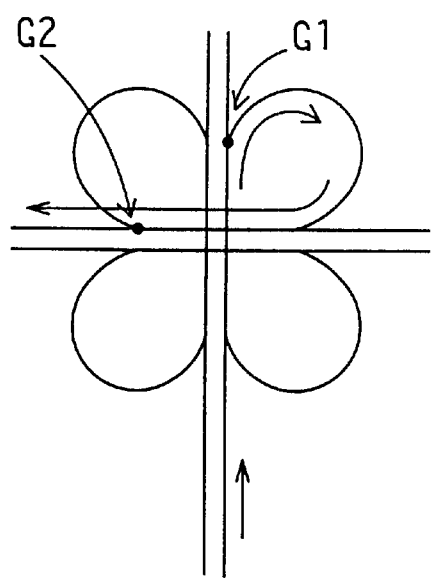
FIGS. 13A–13E are schematic diagrams used for explanations of some examples of representations according to the embodiment of the present invention.
Figure 13B:
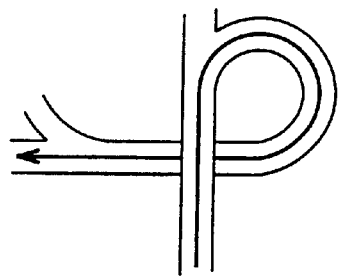

In the case that a motor vehicle travels along an arrow on a cloverleaf-type ramp as shown in FIG. 13A, a schematic diagram of a junction shown in FIG. 13B is displayed by using the pattern [JRQR_JL] in FIG. 10G while the motor vehicle is within the predetermined distance from the next junction corresponding to a first guide point G1. In this case, the forking condition of the guide route at the junction beyond next is displayed together with the next junction. The junction beyond next corresponds to a second guide point G2.

Figure 13C:
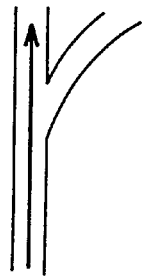

Thereafter a schematic diagram of a junction shown in FIG. 13C is displayed by using the pattern [PASS_R] in FIG. 8F while the motor vehicle is between the first guide point G1 and the second guide point G2, so that the motor vehicle travels without forking to the right exit ramp.

EXAMPLE 4

Figure 10H:
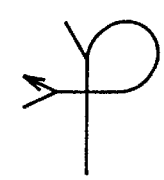
Figure 10I:
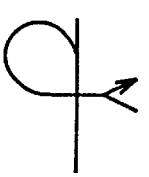
Figure 10J:
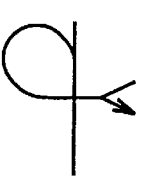
Figure 10K:
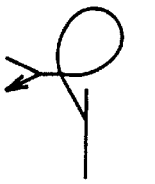
Figure 10L:
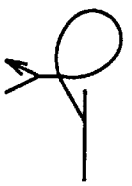
Figure 11A:
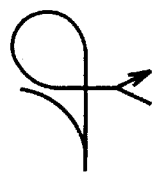
FIGS. 11A–11L are schematic diagrams of patterns, each of which includes a pattern of a junction having a loop exit road and a forking pattern at a junction beyond the loop exit road.
Figure 11B:
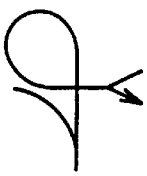
Figure 11C:
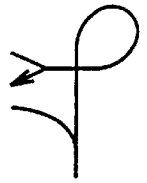
Figure 11D:
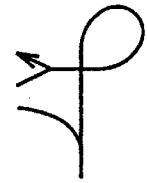
Figure 11E:
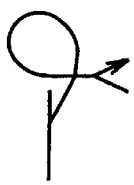
Figure 11F:
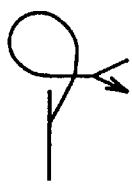
Figure 11G:
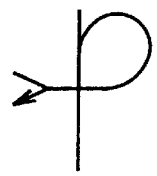
Figure 11H:
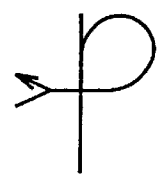
Figure 11I:
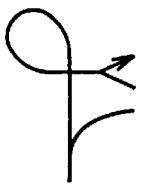
Figure 11J:
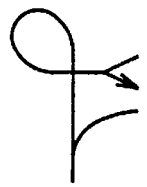
Figure 11K:
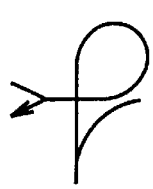
Figure 11L:
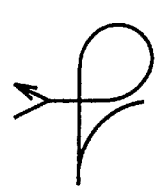
Figure 13D:
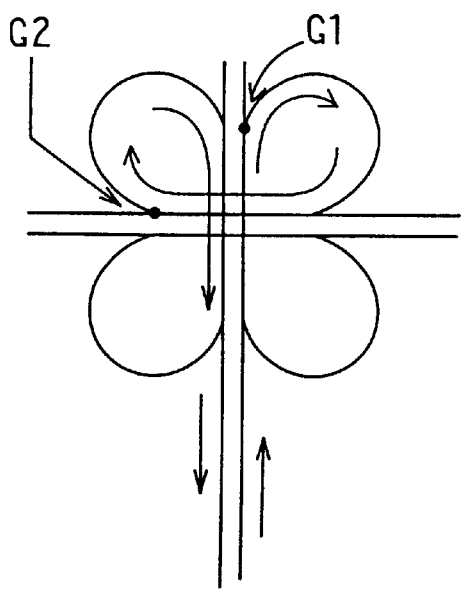
Figure 13E:
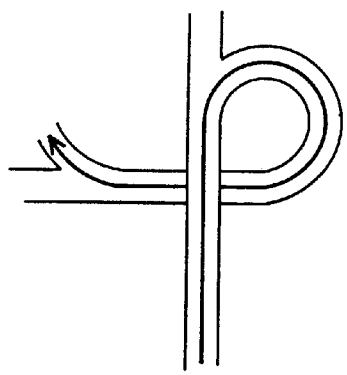

In the case that a motor vehicle travels along an arrow on a cloverleaf-type ramp as shown in FIG. 13D like it makes a U-turn, a schematic diagram of a junction shown in FIG. 13E is displayed by using the pattern [JRQR_JR] in FIG. 10H while the motor vehicle is within the predetermined distance from the next junction corresponding to a first guide point G1.

Thereafter a schematic diagram of a junction shown in FIG. 13B is displayed while the motor vehicle is between the first guide point G1 and a second guide point G2. In this way, a schematic diagram that includes a loop road is displayed for providing the guidance concerning both a first guide point G1 and a second guide point G2 when the guide route runs along two consecutive loop roads.

EXAMPLE 5

Figure 14A:
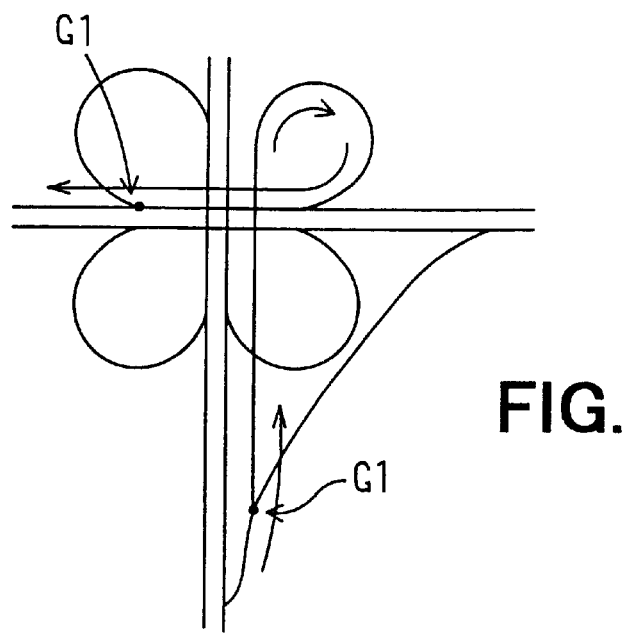
FIGS. 14A–14E are schematic diagrams used for explanations of some examples of representations according to the embodiment of the present invention.
Figure 14B:
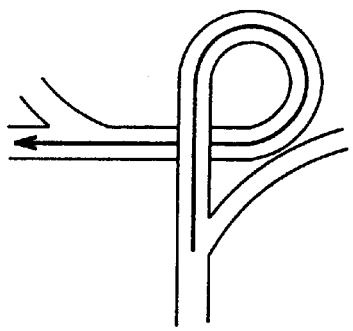

In the case that a motor vehicle travels along an arrow on a cloverleaf-type ramp shown in FIG. 14A, a schematic diagram of a junction shown in FIG. 14B is displayed by using the pattern [JLQR_JL] in FIG. 10C while the motor vehicle is within the predetermined distance from the next junction corresponding to a first guide point G1. In this case, the forking condition of the guide route at the junction beyond next is displayed together with the next junction. The junction beyond next corresponds to a second guide point.

Figure 14C:
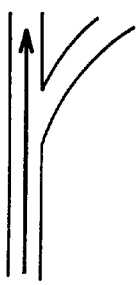

Thereafter a schematic diagram of a junction shown in FIG. 14C is displayed by using the pattern [PASS_R] in FIG. 8F while the motor vehicle is between the first guide point and the second guide point, so that the motor vehicle travels without forking to the right exit ramp.

EXAMPLE 6

Figure 14D:
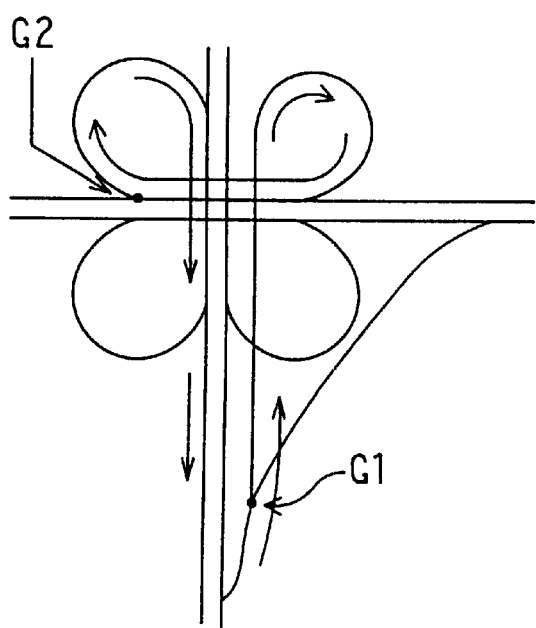
Figure 14E:
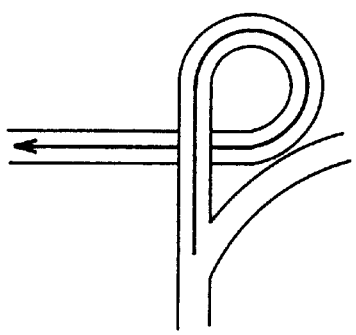
Figure 15A:
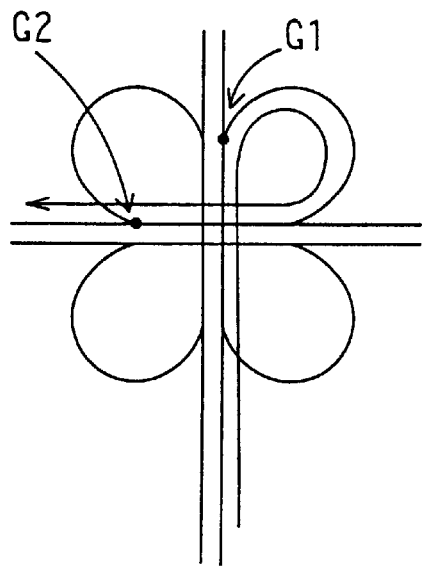
FIG. 15A is a schematic diagram of a cloverleaf-type ramp according to a related art.
Figure 15B:
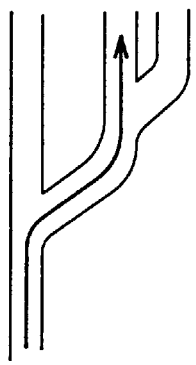
FIG. 15B is an example of a representation in the case that a motor vehicle travels along the cloverleaf-type ramp as shown in FIG. 15A according to the related art.
Figure 15C:
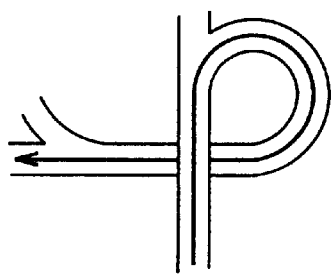
FIG. 15C is an example of a representation in the case that a motor vehicle travels along the cloverleaf-type ramp as shown in FIG. 15A according to the embodiment of the present invention.

In the case that a motor vehicle travels along an arrow on a cloverleaf-type ramp as shown in FIG. 14D like it makes a U-turn, a schematic diagram of a junction shown in FIG. 14E is displayed by using the pattern [JLQR] in FIG. 9B while the motor vehicle is within the predetermined distance from the next junction corresponding to a first guide point G1. In this case, the forking condition of the guide route at the junction beyond next is not displayed because the distance between the first guide point and a second guide point corresponding to the junction beyond next is longer than the predetermined distance (S350:NO).

Thereafter a schematic diagram of a junction shown in FIG. 14B is displayed while the motor vehicle is between the first guide point G1 and the second guide point G2.

Other Embodiments (1) In order to simplify the real-time processing for providing guidance, the process for determining the forking pattern of the guide route at the junction and whether the guide route forks to a loop road at the junction may be performed as follows instead of real-time processing in the above embodiment.

① The pattern of each actual junction on the guide route is determined by using the road data and a schematic diagram of the determined pattern of each junction is stored before the processing for real-time guidance starts. In this case, the process at step S310 in FIG. 3 is performed only by reading the stored pattern corresponding to the next junction.

② The process at step S310–S370 is performed for each actual junction on the guide route and a finally selected schematic diagram of the pattern of each junction is stored beforehand. In this case, the process at step S220 in FIG. 2 is performed only by reading and displaying the stored schematic diagram corresponding to the next junction.

According to these embodiments, the speed of the real-time processing for providing the guidance is improved, but the amount of memory required for storing the schematic diagrams is increased. Therefore these techniques may be selected depending on the requirement for processing speed or memory capacity.

(2) The 12 patterns in FIGS. 9A–19L may be combined with all the 6 patterns in FIGS. 8A–8F into 72 patterns of combined junctions, in contrast to the above embodiment in which no distinction is made between the patterns in FIGS. 8A, 8C, 8F and between the patterns in FIGS. 8B, 8D, 8E with regard to the junction beyond next.

(3) In FIG. 7 in the above embodiment, the process for determining whether the exit road is a loop is performed on condition that the type of the link corresponding to the exit road is a connection road (S720:YES). However, a condition that the link corresponding to the exit road is a one-way road may be added because the exit road cannot be a part of the cloverleaf-type ramp when it is a two-way road.

Furthermore, at step S180 in FIG. 2 in the above embodiment, the guidance using a schematic diagram of a junction is provided on condition that the approach road to the junctions and the first exit road from the junction on the road are both expressway etc. (expressways or access roads). However, the following condition may be added. That is, each of the types of all links which are connected to a node corresponding to the starting points or end points of the exit road and other than the links corresponding to the exit road fulfills any one of the following three conditions;

① a road which is entirely formed of a part of a solid crossing;

② a road which is partly formed of a part of a solid crossing;

② an access road.

The present invention is not limited to the above disclosed embodiment and modifications, but may be implemented in other ways without departing from the spirit of the invention.

What is claimed is:

1. A junction guide device for a vehicle comprising:

storage means storing road data;

control means programmed to set a guide route from a point of departure to a destination by referring to the stored road data; and display means for displaying a forking direction of the guide route at least at a next junction concerning which guidance should be provided when the vehicle approaches a junction on the guide route, wherein the storage means further stores a plurality of pictorial diagrams which pictorially represent predetermined common patterns of a road forking to a plurality of loop roads at a junction for every similar road pattern, each diagram pictorially representing an entire shape of the loop road, and wherein the control mean is further programmed to determine by using the stored road data whether the guide route fork to a loop road at a junction concerning which guidance should be provided, and cause the display means to select and display the pictorial diagram closest corresponding to the junction upon determination that the guide route forks to the loop road at the junction after specifying a road pattern of the loop road.

2. A junction guide device as set forth in claim 1, wherein the control means is further programmed to determine, by referring to the stored road data, which direction the guide route forks at each junction, and select and store the pictorial diagram that represents he determined forking direction at each junction, wherein the control means is further programmed to determine, by using the stored road data, whether the guide route forks to the loop road at a junction concerning which guidance should be provided, and identify a pictorial diagram which corresponds to the junction and includes a representation of the loop road by referring to not only the pictorial diagram which corresponds to the junction and represents the forking direction at the junction but also another pictorial diagram which corresponds to another junction included in the loop road and represents the forking direction at the junction included in the loop road upon determination that the guide route forks to the loop road at the junction, and wherein the display mean displays the identified pictorial diagram.

3. A junction guide device as set forth in claim 1,
wherein the storage means stores, as the road data, nodes and links which constitute a road, and the nodes and link which constitute a connection road have attributes of the connection road, and wherein the control means determines whether the guide route forks to a loop road at a junction by using the links obtained by sequentially searching links that have the attributes of the connection road from a link that includes a node corresponding to the junction and has the attributes of the connection road to an end of a chain of links when the node corresponding to the junction has the attributes of the connection road.

4. A junction guide device as set forth in claim 1, wherein the pictorial diagram of a common pattern of road forking to a loop road at a junction represents the forking direction of the guide route at the junction and the looping direction of the loop road.

5. A junction guide device as set forth in claim 4, wherein when the pictorial diagram of a common pattern of a road forking to a loop road at a junction corresponds to a junction at which the guide route forks to a loop road and there exists a junction beyond the loop road, the display means also represents the forking direction of the guide route at a junction beyond the loop road.

6. A junction guide device as set forth in claim 4, wherein when the control means determines that another junction is within a predetermined distance from the junction, the display means also represents the direction from which another road joins the guide route at the another junction.

7. A junction guide device as set forth in claim 1, wherein the control means selects, based on an estimated shape of the junction, the nearest one of the pictorial diagrams to be displayed by the display means.

8. A junction guide device as set forth in claim 3, wherein the control means determines the loop road by checking whether an angular difference between an initial direction at a start point of the link and a present direction is equal to or greater than a reference angle.

9. A junction guide device for a vehicle comprising:

storage means storing road data;

control means programmed to set a guide route from a point of departure to a destination by referring to the stored road data; and display means for displaying a forking direction of the guide route at least at a next junction concerning which guidance should be provided when the vehicle approaches a junction on the guide route, wherein the storage means further stores a plurality of pictorial diagrams which pictorially represent predetermined common patterns of a road forking to a plurality of loop roads at a junction for every similar road pattern, each diagram pictorially representing an entire shape of the loop road, and wherein the control means is further programmed to determine by using the stored road data whether the guide route forks to a loop road at each junction concerning which guidance should be provided, and determine and store a pictorial diagram corresponding to the junction upon determination that the guide route forks to the loop road at the junction, and wherein the control means is further programmed to select and cause the display means to display the stored pictorial diagram closest corresponding to a junction after specifying a road pattern of the loop road.

10. A junction guide device as set forth in claim 9,
wherein the storage means stores, as the road data, nodes and links which constitute a road, and the stored nodes and links which constitute a connection road have attributes of the connection road, and wherein the control means determines whether the guide route forks to a loop road at a junction by using the links obtained by sequentially searching links that have the attributes of the connection road from a link that includes a node corresponding to the junction and has the attributes of the connection road to an end of a chain of links when the node corresponding to the junction has the attributes of the connection road.

11. A junction guide device as set forth in claim 9, wherein the pictorial diagram of a common pattern of road forking to a loop road at a junction represents the forking direction of the guide route at the junction and the looping direction of the loop road.

12. A junction guide device as set forth in claims 11, wherein when the pictorial diagram of a common pattern of a road forking to a loop road at a junction corresponds to a junction at which the guide route forks to a loop road and there exists a junction beyond the loop road, the display means also represents the forking direction of the guide route at the junction beyond the loop road.

13. A junction guide device as set forth in claim 11, wherein when the control means determines that another junction is within a predetermined distance from the junction, the display means also represents the direction from which another road joins the guide route at the another junction.

14. A junction guide device as set forth in claim 10, wherein the control means determines the loop road by checking whether an angular difference between an initial direction at a start point of the link and a present direction is equal to or greater than a reference angle.

15. A navigation method for a vehicle comprising the steps of:

setting a guide route to destination by using road data stored in a memory device, the guide route including junction of roads;

checking whether a junction in the set guide route is a looped type by using the stored road data;

selecting, based on an estimated loop shape of the checked junction, the nearest one of a plurality of fixed looped road patterns stored in the memory device in generalized common forms respectively, when the checked junction is the looped type; and displaying on a display device the set guide route along with the selected near one of the fixed looped road patterns based on an actual loop shape of the checked junction.

16. A navigation method as set forth in claim 15, wherein the checking step determines if the junction is the looped type by checking if a difference between an initial direction at a start of the junction and a present direction is greater than a reference.

17. A junction guide device comprising:

a position detector for detecting the present position of a motor vehicle;

a storage memory for storing road data, the road data including a plurality of guide route fork patterns, a plurality of guide route loop patterns and a plurality of pictorial junction representations;

a displaying means for displaying one of the plurality of pictorial junction representations;

a controller for controlling the displaying means, wherein the controller is further for:

determining a first angular distance between an approach road to a junction and a first exit road from the junction an a second angular distance between the approach road and a second exit road from the junction and also for determining a classification of the approach road, the first exit road and the second exit road;

selecting one of the plurality of guide route fork patterns based upon the classification, first angular distance and second angular distance;

selecting one of the plurality of guide route loop patterns when another junction in close proximity to the junction is a loop exit and combining the one of the plurality of guide route fork patterns and the one of the plurality of guide route loop patterns to form a combined pattern; and selecting the one of the plurality of pictorial junction representations for display based upon the combined pattern if the another junction in close proximity to the junction is the loop exit.

18. A junction guide device as set forth in claim 17, wherein the controller is further for determining if the another junction is a loop exit by determining if an angular difference between a starting point of an exit link and a current point of the exit link is greater than or equal to a predetermined reference angle.

* * * * *